(12) United States Patent
Rice (10) Patent No.: US 8,449,159 B2
(45) Date of Patent: May 28, 2013

(54) COMBINATION OPTICS LIGHT EMITTING DIODE LANDING LIGHT

(76) Inventor: Lawrence M. Rice, Hillsboro, NH (US)

(*) Notice: Subject to any disclaimer, the term of this patent is extended or adjusted under 35 U.S.C. 154(b) by 101 days.

(21) Appl. No.: 13/317,453

(22) Filed: Oct. 18, 2011

(65) Prior Publication Data

US 2013/0094210 A1  Apr. 18, 2013

(51) Int. Cl.
*F21V 21/00* (2006.01)

(52) U.S. Cl.
USPC ...... 362/545; 362/235; 362/240; 362/249.02; 362/311.02; 362/509

(58) Field of Classification Search
USPC .................. 362/235, 240, 241, 244, 245, 247, 362/249.02, 296.01, 307, 308, 310, 311.01, 362/311.02, 311.14, 326–328, 335, 341, 362/347, 509, 516, 520, 543, 544, 800, 545
See application file for complete search history.

(56) References Cited

U.S. PATENT DOCUMENTS

| | | | |
|---|---|---|---|
| 4,965,488 A | 10/1990 | Hihi | |
| 6,296,376 B1 | 10/2001 | Kondo et al. | |
| 6,814,470 B2 | 11/2004 | Rizkin et al. | |
| 7,092,612 B1 | 8/2006 | Coushaine | |
| 7,106,523 B2 | 9/2006 | McLean et al. | |
| 7,134,774 B2 | 11/2006 | Iwasaki | |
| 7,566,155 B2 | 7/2009 | Schug et al. | |
| 7,580,192 B1 | 8/2009 | Chu et al. | |
| 7,581,855 B2 | 9/2009 | Holder et al. | |
| 7,686,486 B2 | 3/2010 | Tessnow et al. | |
| 7,731,401 B2 | 6/2010 | King et al. | |
| 7,753,574 B2 | 7/2010 | Meyrenaud | |
| 7,758,204 B2 | 7/2010 | Klipstein et al. | |
| 7,796,030 B2 | 9/2010 | Lim | |
| 7,806,562 B2 | 10/2010 | Behr et al. | |
| 7,883,226 B2 | 2/2011 | Li | |
| 7,896,352 B2 | 3/2011 | Justak | |
| 2003/0081897 A1 | 5/2003 | Itoh et al. | |
| 2005/0007664 A1 | 1/2005 | Harris et al. | |
| 2005/0073849 A1 | 4/2005 | Rhoads et al. | |
| 2008/0310166 A1 | 12/2008 | Chinniah et al. | |
| 2009/0213606 A1 | 8/2009 | Coushaine et al. | |
| 2009/0296418 A1 | 12/2009 | Luo et al. | |
| 2010/0002441 A1 | 1/2010 | Ho | |
| 2010/0172140 A1 | 7/2010 | Chen et al. | |

OTHER PUBLICATIONS

Osram brochure captioned "Joule® LED Systems, Joule JFL2—50mm LED—Lightsource" with product specifications, located on website www.osram.com, bearing publication date Sep. 15, 2008 (2 pages, color).
Osram brochure captioned "Osram Joule® JFL2 LED Systems" with technical data, located on website www.osram.com/joul, bearing publication date Feb. 2010 (2 pages, color).

*Primary Examiner* — Stephan F Husar
*Assistant Examiner* — Meghan Dunwiddie
(74) *Attorney, Agent, or Firm* — Edward S. Podszus (57) ABSTRACT

A light module (1) suitable for use as a landing light for an airplane is disclosed, using an elongated array (2) of light emitting diodes (LEDs) as the light source. Light from the LEDs is directed toward a transparent cover (3). The cover (3) may include a plano-convex lens (4) at its center for nominally collimating the light from the LEDs. The cover (3) may also include a generally featureless peripheral region laterally circumferentially surrounding the lens (4). A faceted reflecting surface (6) having a generally parabolic base curvature (8) may extend circumferentially around a longitudinal axis of the landing light from the LEDs to the cover (3). Light exiting the LEDs at a relatively high angle of exitance reflects off the faceted reflecting surface (6) and transmits through the generally featureless peripheral region of the cover (3).

13 Claims, 8 Drawing Sheets

COMBINATION OPTICS LIGHT EMITTING DIODE LANDING LIGHT

TECHNICAL FIELD

The present invention relates to a light module using light emitting diodes as the light source, and a combination of reflective and refractive optics to produce the desired light output pattern.

BACKGROUND OF THE INVENTION

Aircraft landing lights are primarily intended to illuminate the runway directly ahead of the aircraft, with a secondary function of making the aircraft visible to other aircraft. For smaller airplanes, there may be a single landing light mounted near a lower portion of the front of the airplane. For larger aircraft, there may be multiple landing lights mounted on or near the underside of the airplane, typically near the front landing gear and the underside of the wings near the fuselage, although other locations may also be used. In general, landing lights should be extremely bright in an area or angular range directly in front of the aircraft (sometimes referred to as the "hot spot"), as well as require as little electrical power as possible, be lightweight and durable, and have relatively long lifetimes.

Historically, most landing lights have used incandescent light sources in the "PAR" bulb configuration, which includes a parabolic aluminized reflector. Light leaving the filament toward the transparent portion of the bulb leaves the bulb, and light that misses the transparent portion of the bulb generally reflects off the parabolic reflector and exits the bulb in a generally collimated beam that is superimposed with the directly-exiting light from the filament. In general, these bulbs tend to produce a single bright "hot spot" directly in front of the airplane, with very little illumination elsewhere.

There have been numerous attempts to use LEDs as the light source for various applications. For instance, LED-based vehicle lights or light systems are disclosed in U.S. Pat. No. 7,686,486 (Tessnow), U.S. Pat. Appln. Pub. 2005/0073849 (Rhoads), U.S. Pat. No. 7,806,562 (Behr), U.S. Pat. Appln. Pub. 2009/0213606 (Coushaine), U.S. Pat. No. 7,896,532 (Hsu), U.S. Pat. No. 7,134,774 (Iwasaki). Example LED spotlights are disclosed in U.S. Pat. No. 6,814,470 (Rizkin) and U.S. Pat. No. 7,758,204 (Klipstein). Example components for LED-based lights include a toroidal lens disclosed in U.S. Pat. Appln. Pub. 2008/0310166 (Chinniah), a light-source multiplication device disclosed in U.S. Pat. No. 4,965,488 (Hihi), and a reflective element formed from portions of multiple ellipsoids disclosed in U.S. Pat. No. 7,753,574 (Meyrenaud). An example module that features a linear array of five LEDs with controlling circuitry, emitting from the center of a 50 mm diameter cylindrical housing, is currently sold under the name "JOULE® JFL2 LED System" by Osram Sylvania Inc. of Danvers, Mass.

There is an ongoing need for further improved LED systems. When compared with conventional incandescent bulb-based systems, the LED systems may be smaller, may have significantly longer lifetimes, may require significantly less electrical power for operation, and may provide additional illumination in visible regions other than the "hot spot" directly in front of the airplane.

SUMMARY OF THE INVENTION

An embodiment is a light module. An LED array is centered around a horizontal longitudinal axis. The LED array emits light in an angular distribution centered around the longitudinal axis. A lens is disposed longitudinally adjacent to the LED array for receiving light emitted by the LED array. The lens has a thickness that is a maximum at the longitudinal axis and decreases monotonically away from the longitudinal axis. A reflecting surface extends generally from the LED array toward the lens. Proximate the LED array, the reflecting surface has a lateral diameter generally equal to a lateral outer diameter of the lens. The reflecting surface has a base curvature that is a paraboloid centered about the longitudinal axis and has a focus disposed at a center of the LED array. The reflecting surface includes a plurality of facets superimposed on the base curvature. The facets reflect light into a distribution proximate the longitudinal axis and includes light that is directed farther away from the longitudinal axis in both lateral directions and downward. The lens is supported by a generally transparent cover. The cover includes a peripheral portion that laterally circumferentially surrounds the lens and has a generally constant thickness throughout. The peripheral portion and the lens are both integral to the cover.

BRIEF DESCRIPTION OF THE DRAWINGS

The foregoing and other objects, features and advantages disclosed herein will be apparent from the following description of particular embodiments disclosed herein, as illustrated in the accompanying drawings in which like reference characters refer to the same parts throughout the different views. The drawings are not necessarily to scale, emphasis instead being placed upon illustrating the principles disclosed herein.

DETAILED DESCRIPTION OF THE INVENTION

In this document, the directional terms "up", "down", "top", "bottom", "side", "lateral", "longitudinal" and the like are used to describe the absolute and relative orientations of particular elements. For these descriptions, it is assumed that the light module is for a landing light mounted on the front of an airplane, with an output beam that is directly generally horizontally in front of the airplane. Although there may be some slight inclinations away from true horizontal during use, for the purposes of this document, it will be assumed that a longitudinal axis of the landing light is denoted as being horizontal. It will be understood that while such descriptions provide orientations that occur in typical use, other orientations are certainly possible. The noted descriptive terms, as used herein, still apply to the landing light, even if the landing light has an orientation other than installed in the front of an airplane, or is uninstalled in its typical orientation. In other applications, the light module described herein may be used for headlights or fog lights for automobiles.

A light module suitable for use as a landing light is disclosed, using an elongated array of light emitting diodes (LEDs) as the light source. Light from the LEDs is directed toward a transparent cover. The cover may include a plano-convex lens at its center for nominally collimating the light from the LEDs. The cover may also include a generally featureless peripheral region laterally circumferentially surrounding the lens. A faceted reflecting surface having a generally parabolic base curvature may extend circumferentially around a longitudinal axis of the landing light from the LEDs to the cover. Light exiting the LEDs at a relatively high angle of exitance reflects off the faceted reflecting surface and transmits through the generally featureless peripheral region of the cover. While most of the light from the LEDs ends up in a hot spot near the longitudinal axis, the facets on the reflecting surface may decollimate and/or redirect a portion of the light away from the hot spot to both lateral sides and to an area below the longitudinal axis, which, for an airplane landing light, may be helpful for maneuvering when the airplane is on the ground.

The above paragraph is merely a generalization of several of the elements and features described in detail below, and should not be construed as limiting in any way.

Figure 1:
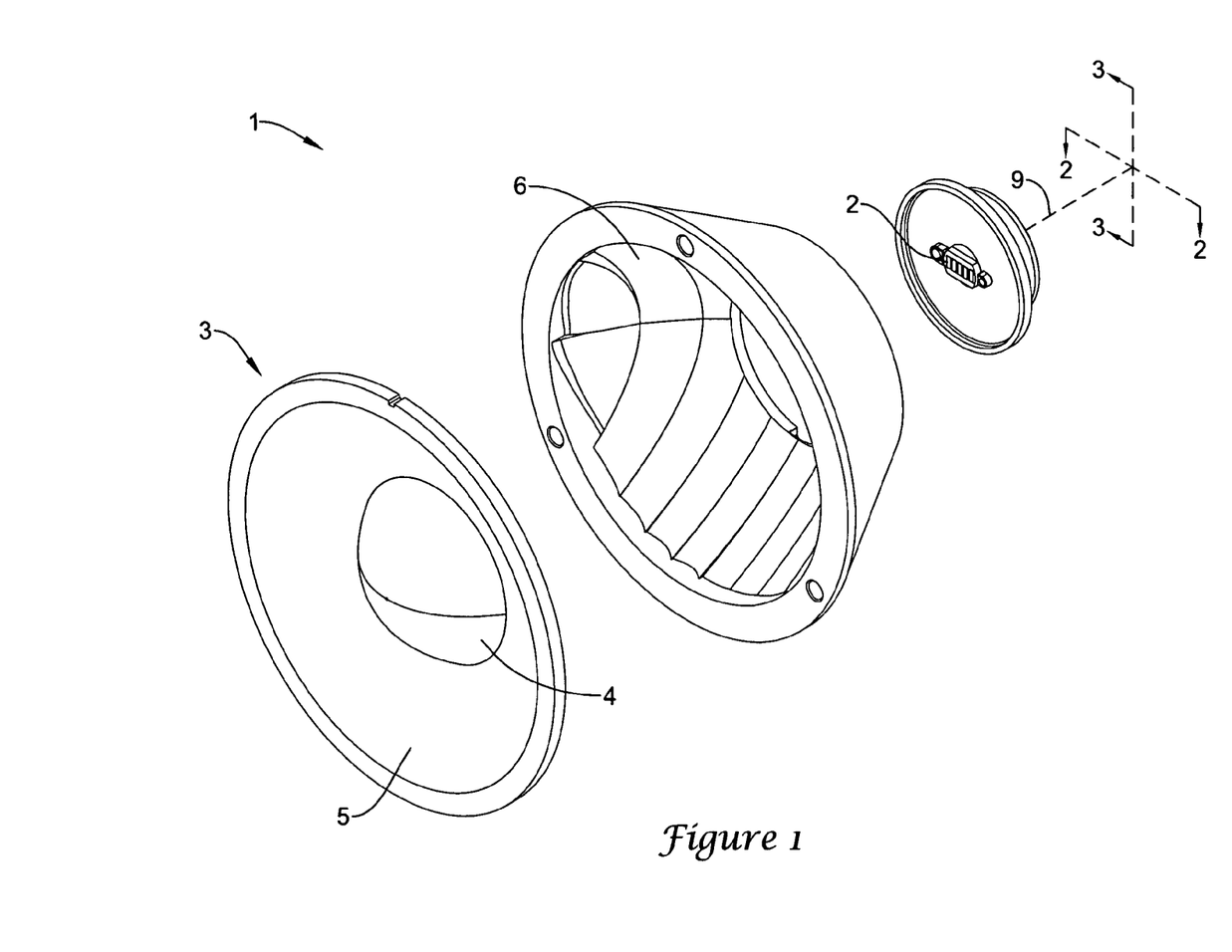
FIG. 1 is an exploded-view drawing of an example light module.
Figure 2:
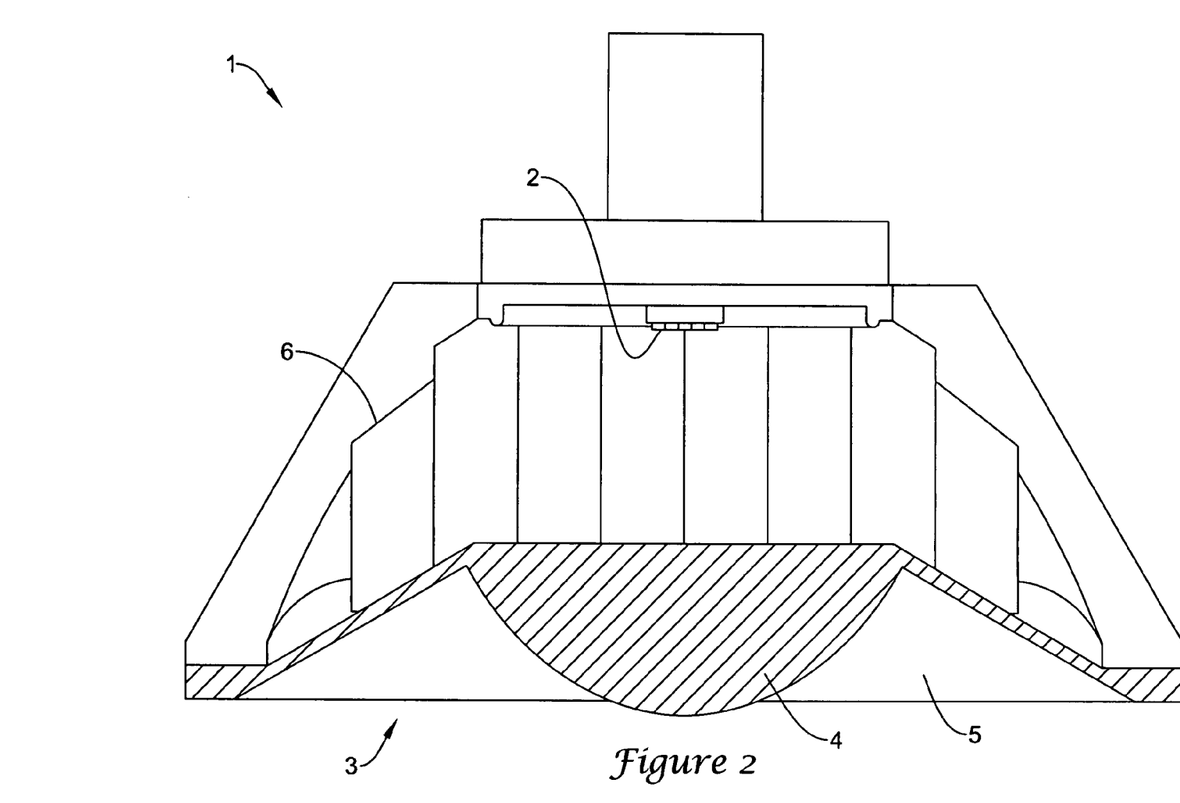
FIG. 2 is a horizontal cross-sectional drawing of the light module of FIG. 1.
Figure 3:
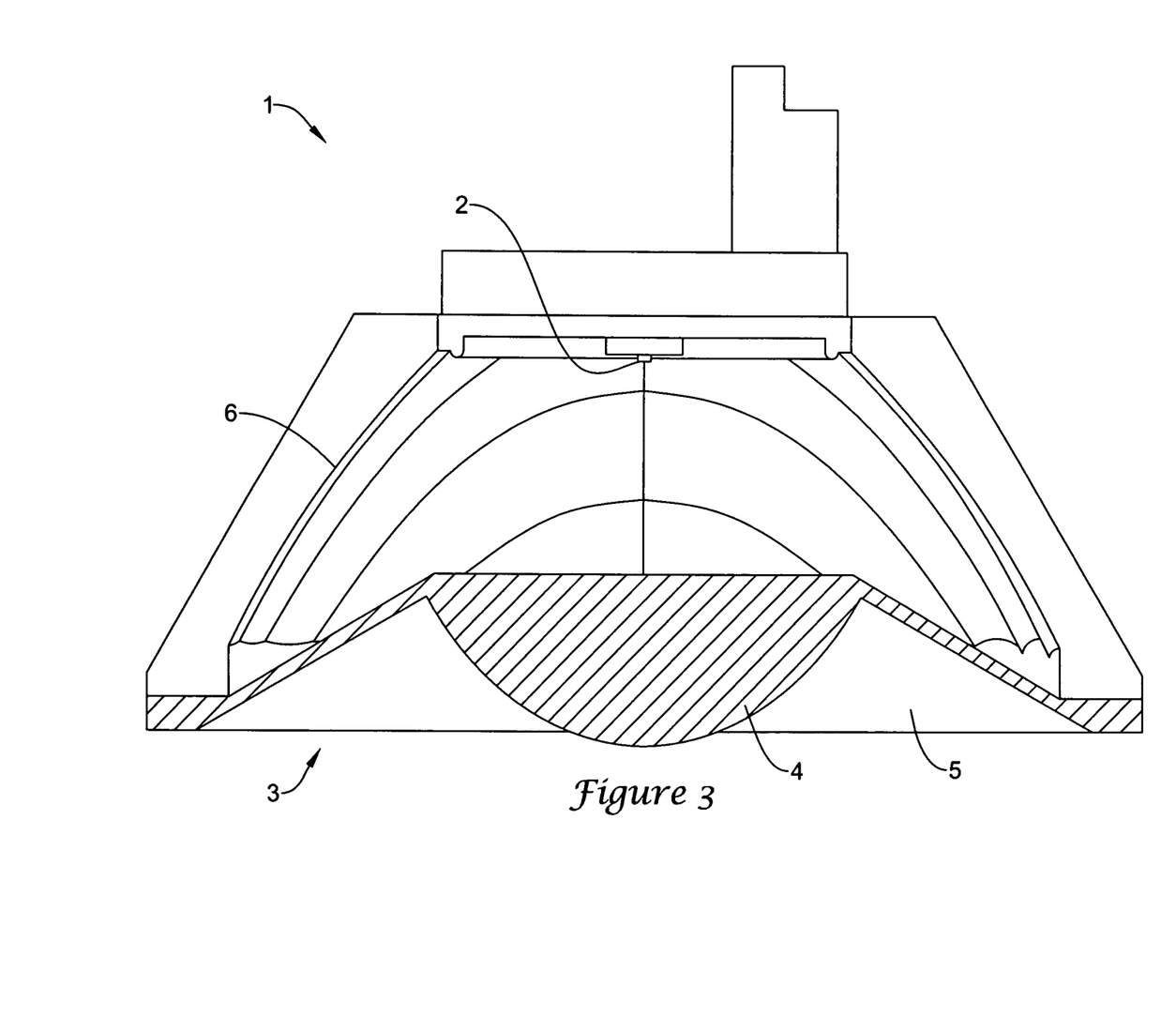
FIG. 3 is a vertical cross-sectional drawing of the light module of FIG. 1.

FIG. 1 is an exploded-view drawing of an example light module 1. FIG. 2 is a horizontal cross-sectional drawing of the light module 1 of FIG. 1. FIG. 3 is a vertical cross-sectional drawing of the light module 1 of FIG. 1. Regarding the terms "horizontal" and "vertical", it should be noted that in actual use, the light module 1 may be a landing light be mounted on the front of an airplane and, may emit light generally horizontally to illuminate portions of a runway in front of the airplane. For other applications, the light module 1 may be a headlight or a fog light mounted on the front of an automobile or other vehicle.

The light source for the light module 1 is an array 2 of light emitting diodes, or LEDs. Note that in most cases, the LEDs in the array 2 may emit light directly into air. In other cases, the LEDs may emit light into small glass or plastic hemispheres that are attached at or near the emission surfaces of the individual LEDs.

In general, the LED array 2 may be elongated in one dimension, such as with a linear array 2 of individual LEDs. For instance, the LED array 2 may include a row of five individual LEDs, arranged in a 1 by 5 pattern. The optics of the light module 1 generally preserve the elongation of the LED array 2, so that a particular aspect ratio of the surface area of the LEDs in the LED array 2 maps to roughly the same aspect ratio in the angular distribution of the so-called "hot spot" that emerges from the light module 1. Mathematically, for a particular x- or y-dimension, the angular distribution in radians roughly equals a linear dimension of the LED divided by a focal length of the collimating optics. From this relationship, it becomes clear that if the LED light source is five times larger in x- than in y-, then the angular distribution of light leaving the light module 1 may be roughly five times wider in x- than in y-. Alternatively, the LED array 2 may be square, rather than elongated, or may be clustered around a longitudinal axis 9 of the light module 1.

The LED array 2 may include so-called "white light" LEDs. Typically, a white light LED includes a light source that emits light in the blue or violet portions of the spectrum, and includes a phosphor that absorbs the blue or violet source light and reemits light over a relatively broad part of the spectrum, typically peaking in the yellow wavelengths. When viewed by the human eye, light from a white light LED does appear to be generally white, although there may be a bluish tint to the light from source-emitted light being mixed with the phosphor-emitted light. The spectral characteristics of white light LEDs may be well-suited for the application of a light module 1, and may help produce a generally high contrast between the runway and any lines painted on the runway.

The physical package of the LED array 2 may vary as needed. In some cases, the LED array 2 may be centered on a flat face of a generally wafer-shaped cylindrical package, and may emit light with an angular distribution that is centered around a longitudinal axis 9 of the wafer-shaped cylindrical package. It is understood that other suitable physical packages may be used as well.

As an example, a commercially available LED array 2 that may be suitable for use in the light module 1 is currently sold under the name "JOULE® JFL2 LED System" by Osram Sylvania Inc. of Danvers, Mass. The JFL2 includes a linear array 2 of five LEDs with controlling circuitry, emitting from the center of a 50 mm diameter cylindrical housing. The JFL2 accepts input voltages between 9 and 19 volts, and uses 14 watts of power. There is suitable heat sinking in the JFL2. In particular, the JFL2 has a typical predicted lifetime of about 5000 hours, which is significantly longer than most incandescent-based light modules, which may typically last only 25 hours. At present, a typical JFL2 may have a luminous flux typically around 600 lumens, when installed. In general, as LEDs become more efficient over time, this luminous flux number is expected to rise, such as to 750 lumens, 1000 lumens, or 1250 lumens or more. Note that the JFL2 is merely an example of a suitable LED array 2; other suitable LED arrays may be used as well.

Depending on the location and direction of light emitted from the LED array 2, the emitted light may arrive in one of three locations: at an incident face of a lens at the center of a transparent cover, at a faceted reflective surface that circumferentially surrounds a portion of the longitudinal axis 9, or an annular region between the above two locations.

Note that light that enters the annular region directly from the LED array 2 generally does not contribute significantly to the useful light output, and may be considered wasted. In general, a choice of component size and location may reduce or eliminate this particular condition. For instance, moving the incident face of the lens closer to the LED array 2 may reduce this condition, as well as extending the faceted reflecting surface longitudinally away from the LED array 2. Because this condition can actively be controlled during the design phase of the light module 1, we concentrate below on the remaining two conditions, both of which contribute to the output light distribution: (1) light leaving the LED array 2 at low angles of exitance (i.e., with a relatively small angular deviation away from a longitudinal axis 9 of the light module 1), passing through the lens at the center of the cover, and leaving the cover being generally collimated, and (2) light leaving the LED array 2 at high angles of exitance, reflecting off the faceted reflecting surface being nominally collimated, and passing through a peripheral portion of the cover. We first describe the particular optical elements in the light module 1, then discuss the two conditions noted above.

The generally transparent cover 3 may be a molded plastic or glass element that includes a lens 4 in its central portion (i.e., the portion that surrounds the longitudinal axis 9 of the light module 1), and a peripheral portion 5 that surrounds the lens 4. Materials may include any suitable plastic material, such as polycarbonate, or glass, such as a crown glass like BK7, or a flint glass like SF6. In general, the suitable optical materials typically have a refractive index in the visible portion of the spectrum between about 1.4 and about 1.9. Alternatively, the lens 4 may be manufactured separately from the cover 3, and may be held in place or supported by the cover 3. As a further alternative, the lens 4 may be supported by other mechanical supports that hold in place longitudinally adjacent to the LED array 2.

In some cases, the generally transparent cover 3 may help seal the light module 1, and may help protect the LED array 2 and its associated electronics from the natural elements, such as moisture and contamination. Advantageously, the transparent cover 3 may physically support the lens 4 with no additional elements, such as "spider arms" or other filamentary structures that extend radially outward from the lens 4.

The lens 4 may be a positive lens. Such a lens 4 may have a thickness that is a maximum at the longitudinal axis 9 and decreases monotonically away from the longitudinal axis 9. In general, for a positive lens, the center of the lens is thicker than a lateral edge of the lens.

A preferred shape for the lens 4 is plano-convex, with the generally flat side facing the LED array 2, and the convex side facing away from the LED array 2. Such a configuration may be preferred for optical considerations, because for a collimating lens, a plano-convex lens having a light source facing the flat side and a collimated beam emerging from the curved side has reduced coma, when compared to a bi-convex lens or a plano-convex lens in the reverse orientation. Note that coma is a wavefront aberration, and that a reduction in wavefront aberrations for an element generally leads to relaxed tolerances when manufacturing and aligning the element. Such a configuration may also be preferred for manufacturing considerations, because some particular molding processes may be simpler if they include a flat side to the lens, rather than a curved side.

For a plano-convex lens 4 in air, the focal length is given by the (refractive index minus 1), multiplied by the radius of curvature of the convex side. If the LED array 2 is placed at the focal plane of the lens 4, then light emitted from the LED array 2 emerges from the lens 4 as being generally collimated. If the LED array 2 is centered on the longitudinal axis 9 of the light module 1, the generally collimated light may have a far-field distribution that is generally centered along the longitudinal axis 9. Because the LED is elongated along the horizontal axis, the far-field distribution may also be elongated along the horizontal axis.

Note that even though the emergent light may be collimated, the light distribution may have a finite (non-zero) angular spread to it. This occurs as a natural consequence of collimating an extended source. In general, after collimation by an element having a focal length "F", an extended source having a size "X" will produce a collimated distribution having an angular spread, in radians, given by X/F. The larger the light source, the larger the angular spread. Some typical values for angular spread from the light module 1 may be full-widths of about 12 degrees in the horizontal direction and about 6 degrees in the vertical direction, measured in simulation at 10% of the peak candela value. It is understood that these numerical values are merely examples, and that other numerical values may also be used.

The plano-convex lens 4 may include an aspheric component to the convex side. In other words, the curvature of the convex side may deviate from a true spherical surface by a small amount that is described numerically by one or more aspheric coefficients and/or a non-zero conic constant. Such numerical descriptions of aspheric surfaces are well-known in the art. Note that the flat side to the lens 4 does not produce any inherent wavefront aberrations, and generally does not benefit from adding any aspheric components.

Although the lens 4 may have a radius of curvature that is symmetric in both the horizontal and vertical directions, the lens 4 may have aspheric components that are different in the horizontal and vertical directions. Note that such differences are fairly minute, and that an observer will likely not be able to detect such an asymmetry by eye, just by looking at the surface.

In the vertical direction, given by a vertical cross-section of the convex surface, the aspheric component may be used to reduce or eliminate spherical aberration. Note that spherical aberration is a wavefront aberration, and that lenses having excessive amounts of spherical aberration may show reduced performance. Performance of the lens 4 may be improved by adding the aspheric component in the vertical direction of the convex surface of the lens, which may reduce or eliminate spherical aberration.

In the horizontal direction, given by a horizontal cross-section of the convex surface, very good correction of spherical aberration may lead to an unexpected, and potentially undesirable, feature in the light output from the lens 4. Specifically, the LED array 2 is made up of individual LEDs, typically arranged as squares, and separated by small dead spaces from which no light emerges. If one were to collimate the light from such an LED array 2 with a very well-corrected lens 4, one would see these dead spaces in the angular distribution of the collimated beam. In other words, there would be particular angles, corresponding to the dead spaces between adjacent LEDs, at which the light output distribution would be dark. This would show up as dark stripes on the runway, parallel to the direction of travel, which would be highly undesirable.

In order to avoid having these undesirable dark locations in the output, the aspheric component in the horizontal direction may be set to something other than the value that gives the best spherical aberration correction. Having less-than-optimal spherical aberration correction in the horizontal direction may lead to desirable slight blurring in the horizontal direction. With this slight blurring, the bright areas from the active LEDs are blended over the dark areas between the LEDs to smooth out the light distribution. Note that this blurring may also blur out the sharp lateral edges to the light distribution, which is far less objectionable than having dark lines in the light distribution.

Note that for this particular application, the term "generally collimated" is intended to include both the well-corrected case in the vertical direction, as well as the slight blurring that occurs in the horizontal direction.

Having discussed the lens 4 in the central portion of the cover 3, we turn to the peripheral portion 5 that surrounds the lens 4.

The peripheral portion 5 may be a generally thin portion of the outside shell of a cone, extending from a lateral edge of the flat side of the plano-convex lens to a lateral edge of the faceted reflecting surface, and if desired, laterally and/or longitudinally beyond the faceted reflecting surface. The cover 3 may attach to a housing (not shown) at its lateral edge, and therefore the peripheral portion 5 may physically support the lens 4. Note that in some cases, the lens 4 is made integral with the cover 3; in other cases, the lens 4 may be made separately and attached to the cover 3.

In some cases, the only optical function of the peripheral portion 5 may be to transmit nominally collimated light that has been reflected by the faceted reflecting surface 6. For these cases, the peripheral portion 5 may be essentially featureless, and may have an essentially constant thickness throughout. In other cases, the thickness may vary in a slowly-varying manner, such as a wedge that increases the thickness of the peripheral portion 5 from one edge to another. In each of these cases, the peripheral portion 5 receives nominally collimated light and transmits the nominally collimated light without significantly altering its collimation.

Note that there is a design trade-off involved with how far the peripheral portion 5 should extend longitudinally beyond the flat side of the lens 4. In the extreme case where the peripheral portion 5 extends purely laterally from the flat side of the lens 4, there may be a large fraction of the light emitted from the LED array 2 that passes through peripheral portion 5 without first reflecting off the faceted reflecting surface 6, thereby wasting too large a fraction of the light. In the other extreme, where the peripheral portion 5 extends a great distance longitudinally beyond the flat side of the lens, there may be a significant fraction of light wasted by Fresnel reflections entering and exiting the peripheral portion 5 of the cover 3, which would occur at unnecessarily high angles of incidence.

In practice, a reasonable compromise may be dictated by the condition at which rays leaving the LED array 2 and just missing the lateral edge of the flat side of the lens 4 just strike the longitudinal edge of the faceted reflecting surface 6. Optically, there is little reason to extend the faceted reflecting surface 6, and the accompanying peripheral portion 5 of the cover 3, longitudinally beyond this condition.

Also in practice, there may be volume constraints on the light module 1. For instance, the LED-based light module 1 may have to fit within the volume envelope that the comparable incandescent-based light once fit. For instance, the light module 1 may fit into an existing mounting structure for a PAR 36 bulb. It will be understood that these volume constraints may be extended to many other sizes of par lamps and other applications as well.

Figure 4:
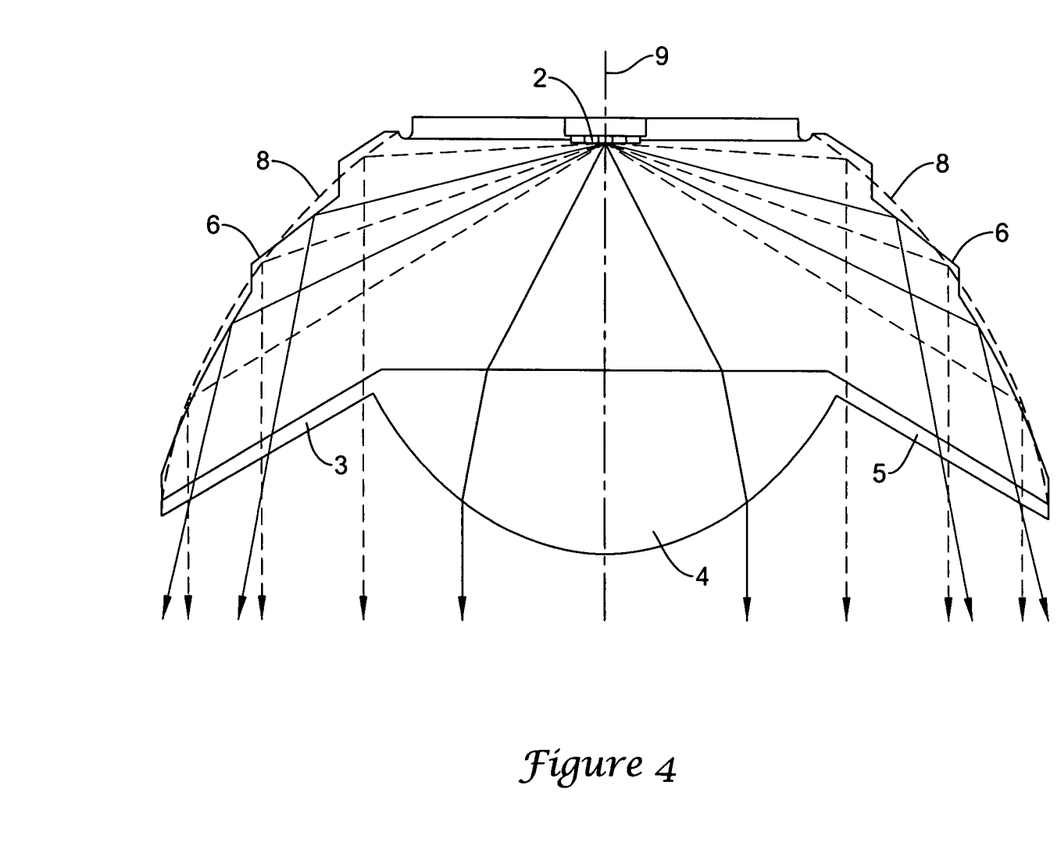
FIG. 4 is a horizontal cross-sectional drawing of the light module of FIG. 1, analogous to FIG. 2, but showing only a slice of the optical surfaces.

Having discussed the lens 4 and peripheral portion 5 of the cover 3, we turn to the faceted reflecting surface 6. FIG. 4 is a horizontal cross-sectional drawing of the light module of FIG. 1, analogous to FIG. 2, but showing only a slice of the optical surfaces.

In most cases, the faceted reflecting surface 6 may be formed as a metallic coating, such as aluminum, deposited on a front surface of a molded plastic or glass element. For these cases, the reflecting surface may be air-incident. In other cases, the reflecting surface may lie beneath a protective layer so that it is not truly air-incident. In still other cases, the reflecting surface may be deposited on the rear surface of the molded element. For all of these configurations, the reflecting surface is the quantity of interest, since the light from the LED array 2 reflects off this reflecting surface before transmitting through the peripheral portion 5 of the cover 3 and exiting the light module 1.

Although the faceted reflecting surface 6 is a tangible structure producing a tangible reflection, it may be easiest to think of the surface itself as being formed from a virtual surface having a base curvature 8, with the facets forming relatively small perturbations from the base curvature 8. It is instructive to discuss what characteristics reflections from the base curvature 8 would have, despite there being no physical surface from which to reflect. Once these virtual reflections are understood, one may more easily understand the perturbations to these virtual reflections caused by the facets.

The base curvature 8 of the faceted reflecting surface 6 may be a paraboloid centered about the longitudinal axis 9 and having a focus disposed at a center of the LED array 2. Light originating from the center of the LED array 2 would be collimated by a reflection off the base curvature 8, and would be reflected in a direction parallel to the longitudinal axis 9. Light originating from locations elsewhere on the LED array 2, other than at the center, would also be collimated, but would be reflected in directions that form non-zero angles with respect to the longitudinal axis 9. This behavior is analogous to transmission through the lens 4, in that the beam, after collimation, includes a range of propagation angles that vary with the size of the LED array 2, divided by the focal length of the corresponding collimation element. Note that the respective focal lengths of the paraboloid and the lens may be the same, or may be different.

If there were no facets present, the light reflected off the base curvature 8 would be collimated, would all pass through the peripheral portion 5 of the cover 3, and would resemble the light that passes through the lens, optionally with different angular extents if the focal lengths of the paraboloid and the lens were different. This would lead to the output distribution having a so-called "hot spot", with little or no light being present outside the hot spot.

The presence of the facets ensures that some of the light reflecting off the faceted reflecting surface 6 deliberately ends up outside the hot spot. In FIG. 4, the dashed rays represent light reflected from a virtual surface having the base curvature 8, and the solid rays represent light reflecting from the physical facets.

In particular, some or all of the facets provide some tilt and/or decollimation to the reflected beam, when compared with a virtual reflection from the base curvature 8. The deviations of the facets from the base curvature 8 may include a plane of particular orientation, which redirects the beam from the nominal base curvature 8 reflection, and may include some curvature, which may slightly decollimate the beam from the nominal base curvature 8 reflection. In some cases, the curvatures of the facets may be different in the horizontal and vertical directions, and may even be of opposite sign. Note that the facets themselves may be curved or may be flat.

In particular, when compared with reflections of light from the LED array 2 off a virtual surface shaped as a the base curvature 8 paraboloid, reflections off the facets include light that is directed farther away from the longitudinal axis 9 in both lateral directions and downward. Such a direction of light away from the "hot spot" may be beneficial in that it may provide additional visibility to the lateral sides of the runway and directly in front of the airplane when the plane is maneuvering on the ground. Note that in general, such deviations away from the hot spot are generally not possible with conventional incandescent-based light modules that use parabolic reflectors.

The actual locations and orientations of the facets may be varied as needed. In some cases, the facets may have borders that are elongated vertically, although they may optionally be elongated horizontally, may be square, or may be a combination of regular and/or irregular elongations. In some cases, there may be two, three, four, five, six, seven, eight, nine, 10, 11, 12, 18, 20 or more than 20 individual facets. In some cases, a single facet may extend vertically across the entire faceted reflective surface; in other cases, the facets may end at a border between a top half and a bottom half of the faceted reflective surface.

Figure 5:
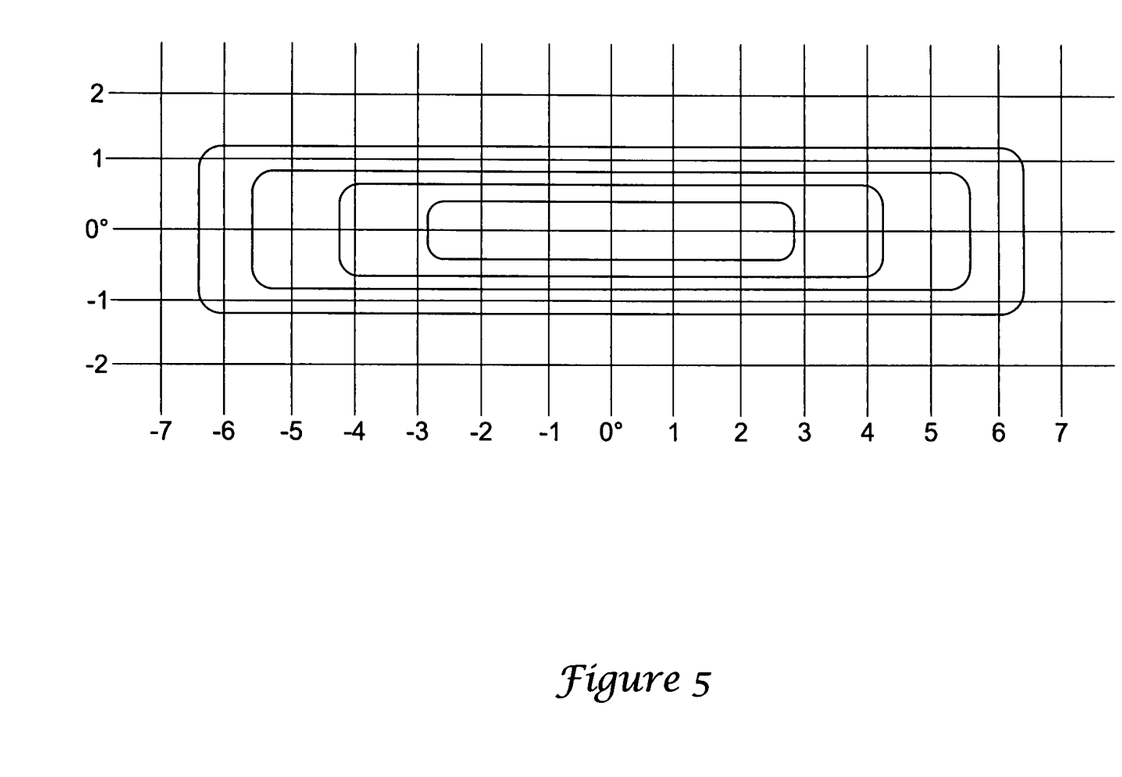
FIG. 5 is an example two-dimensional contour plot of the light intensity exiting the light module through the lens.

FIG. 5 is an example two-dimensional contour plot of the light intensity exiting the light module 1 through the lens. The intensity is the optical power per solid angle, as a function of propagation angle in the horizontal and vertical directions. On the plot, the longitudinal axis 9 is at the intersection of the zero horizontal propagation angle and the zero vertical propagation angle. The distribution plotted distribution generally corresponds to the "hot spot" that one would see from the cockpit of an airplane, looking out the front window down the runway.

In the example of FIG. 5, the output light is essentially uniform over a generally rectangular angular range, where the rectangle is wider in the horizontal direction than in the vertical direction. The aspect ratio of the rectangle is roughly the same as the aspect ratio of the LED array 2. As noted above, the lens may include a small amount of spherical aberration in one direction, which may smooth out the intensity distribution along the horizontal direction, in order to avoid seeing dark bands in the output that arise from the spaces between adjacent LEDs in the LED array 2.

Figure 6:
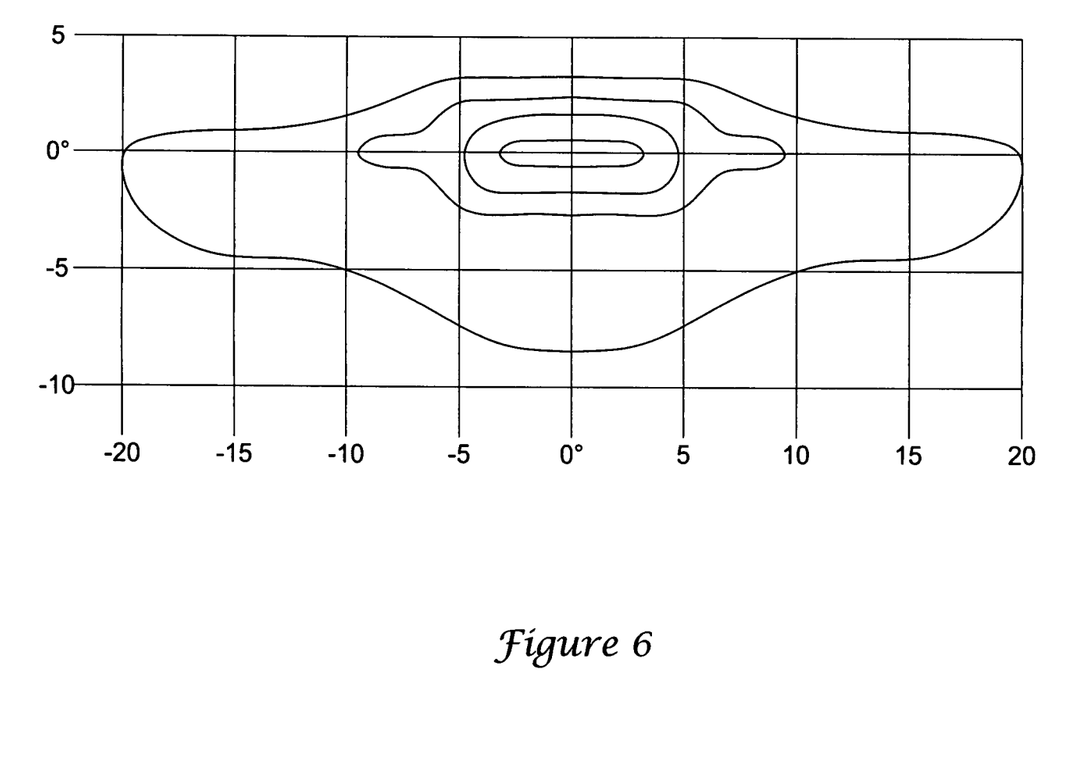
FIG. 6 is an example two-dimensional contour plot of the light intensity exiting the light module after reflecting off the faceted reflecting surface.

Note that FIG. 5 plots only the light that exits through the lens 4 at the center of the cover 3. FIG. 6 is an example two-dimensional contour plot of the light intensity exiting the light module 1 after reflecting off the faceted reflecting surface 6. Note that the absolute scales may be the same or different for FIGS. 5 and 6.

Compared with FIG. 5, the plot of FIG. 6 shows that some light is deliberately directed laterally and downward out of the hot spot. When an airplane is on the ground, this light may help better illuminate the lateral portions of the runway and the area directly in front of the plane. As noted above, most or all of this redirected light arises from facets on the faceted reflecting surface 6 having a slight departure from the paraboloidal base curvature 8 of the faceted reflecting surface 6.

Note that FIG. 6 plots only the light that exits through the light module 1 after reflecting off the faceted reflecting surface 6. The true output of the light module is the superposition of the intensities shown in FIGS. 5 and 6.

Figure 7:
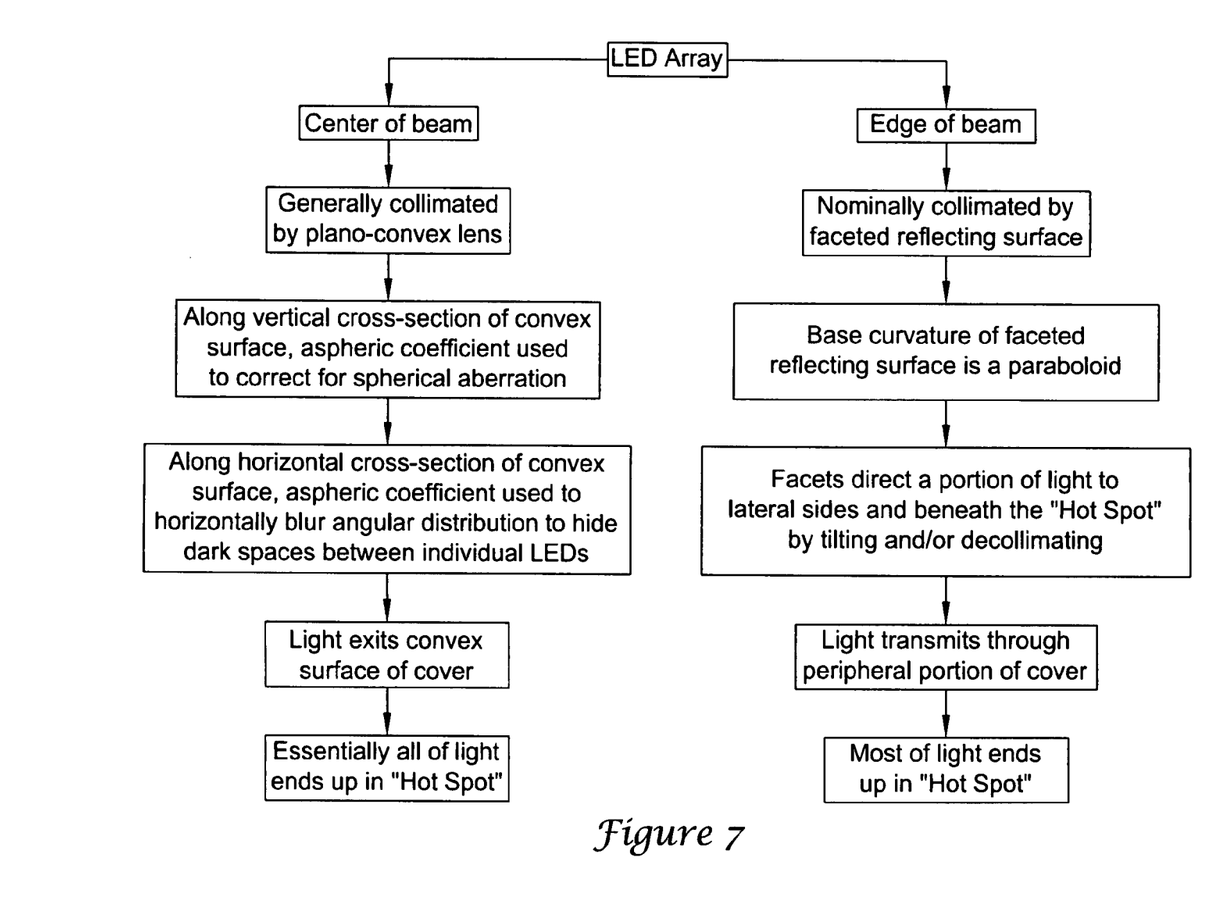
FIG. 7 is a flow chart describing the general operation of the light module of FIG. 1.

FIG. 7 is a flow chart describing the general operation of the light module 1. This flow chart is intended to be merely a summary of the operation, and is not intended to be limiting in any way. The LED array 2 produces an emitted beam, with the center of the beam being directed toward the lens 4 in the center of the cover 3, and the edge of the beam simultaneously being directed toward the reflector.

For the center of the beam, light is generally collimated by the plano-convex lens 4 in the central portion of the cover 3. It is understood that lenses having other shapes may be used as well.

Along a vertical cross-section of the convex surface, the aspheric coefficient may be used to correct for spherical aberration, which may lead to excellent collimation of the light. Along a horizontal cross-section of the convex surface, the aspheric coefficient may be used to horizontally blur the angular distribution, which may hide dark spaces in the light output from the space between the individual LEDs. Note that if the aspheric coefficient were used to correct for spherical aberration in this direction as well, then the well-collimated, well-corrected beam might show these dark spaces, which would be undesirable. As such, the term "generally collimated" is intended to include this horizontal blurring that obscures the dark regions in the output.

Light exits the convex surface of the cover 3 as being generally collimated. Essentially all of the light in this center of the beam, which is generally collimated by the lens, ends up in the so-called "hot spot" that surrounds the longitudinal axis 9. The horizontal blurring that hides the dark spaces may produce some slight blurring of the horizontal edges of the hot spot; this condition is included by the phrase "essentially all" of the light.

For the edge of the beam, light is nominally collimated by the faceted reflecting surface 6. The faceted reflecting surface 6 may have a virtual base curvature 8 in the shape of a paraboloid. The actual reflecting surface may include facets superimposed on top of the virtual base curvature 8. Each facet may include some tilt and/or curvature in the horizontal and/or vertical directions. Light reflecting off the facets may not be truly collimated and parallel to the longitudinal axis 9, which would be the case if the faceted reflecting surface 6 lacked the facets and were just a paraboloid, but may include tilts and/or decollimations caused by the facets. The facets redirect a portion of the light to the lateral sides of the hot spot and beneath the hot spot, in order to provide some short-range illumination when the plane is maneuvering on the ground. Note that this redirected light may typically be a small fraction of the light directed toward the hot spot.

After reflection off the faceted reflecting surface 6, the light exits the light module 1 through the peripheral portion 5 of the cover 3.

Note that thus far, it has been assumed that the cover 3 and faceted reflecting surface are basically rotationally symmetric about the longitudinal axis 9. As an alternative, they may also have an elongated, elliptical, square, rectangular, or other polygonal profile.

Figure 8:
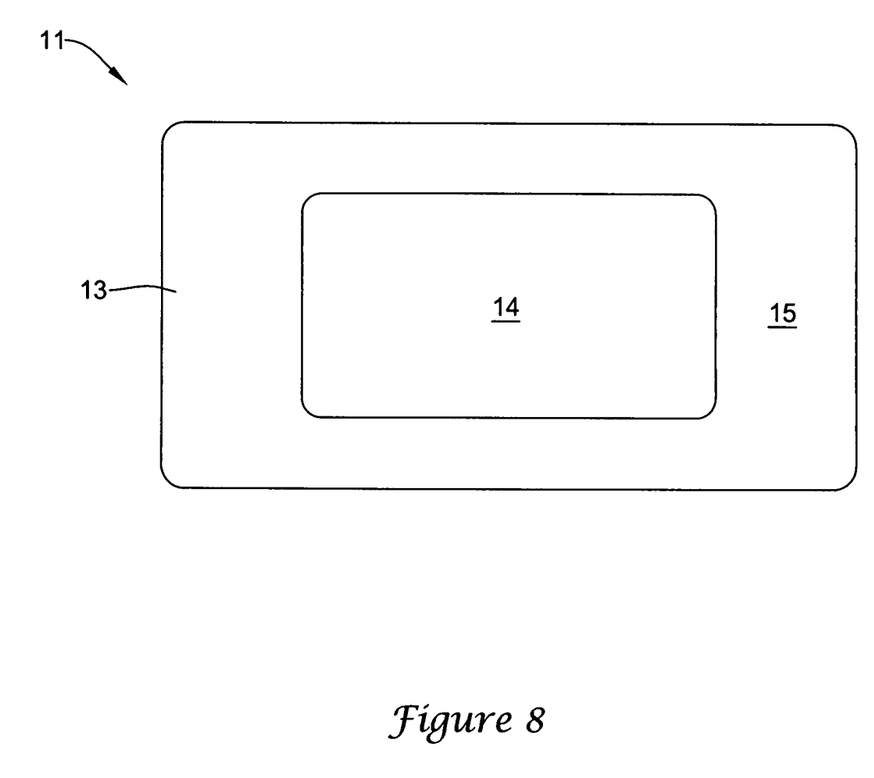
FIG. 8 is a front-view drawing of a cover that has a generally rectangular boundary between the lens in the central portion and the peripheral portion.

For instance, FIG. 8 is a front-view drawing of a light module 11 with a cover 13 that has a generally rectangular boundary between the central portion 14 and the peripheral portion 15. The rectangular boundary may optionally have rounded corners. Other profiles may also be used as well.

Unless otherwise stated, use of the words "substantial" and "substantially" may be construed to include a precise relationship, condition, arrangement, orientation, and/or other characteristic, and deviations thereof as understood by one of ordinary skill in the art, to the extent that such deviations do not materially affect the disclosed methods and systems.

Throughout the entirety of the present disclosure, use of the articles "a" or "an" to modify a noun may be understood to be used for convenience and to include one, or more than one, of the modified noun, unless otherwise specifically stated.

Elements, components, modules, and/or parts thereof that are described and/or otherwise portrayed through the figures to communicate with, be associated with, and/or be based on, something else, may be understood to so communicate, be associated with, and or be based on in a direct and/or indirect manner, unless otherwise stipulated herein.

Although the methods and systems have been described relative to a specific embodiment thereof, they are not so limited. Obviously many modifications and variations may become apparent in light of the above teachings. Many additional changes in the details, materials, and arrangement of parts, herein described and illustrated, may be made by those skilled in the art.

PARTS LIST 1 light module
2 LED array
3 cover
4 lens
5 peripheral portion of cover
6 faceted reflecting surface
8 paraboloidal base curvature of faceted reflecting surface
9 longitudinal axis
11 light module
13 cover
14 central portion of cover
15 peripheral portion of cover

What is claimed is:

1. A light module (1), comprising:
an LED array (2) centered around a horizontal longitudinal axis (9), the LED array (2) emitting light in an angular distribution centered around the longitudinal axis (9);
a lens (4) disposed longitudinally adjacent to the LED array (2) for receiving light emitted by the LED array (2), the lens (4) having a thickness that is a maximum at the longitudinal axis (9) and decreases monotonically away from the longitudinal axis (9); and a reflecting surface (6) extending generally from the LED array (2) toward the lens (4);

wherein proximate the LED array (2) the reflecting surface (6) has a lateral diameter generally equal to a lateral outer diameter of the lens (4);

wherein the reflecting surface (6) has a base curvature (8) that is a paraboloid centered about the longitudinal axis (9) and having a focus disposed at a center of the LED array (2);

wherein the reflecting surface (6) includes a plurality of facets superimposed on the base curvature (8);

wherein the facets reflect light into a distribution proximate the longitudinal axis (9) and includes light that is directed farther away from the longitudinal axis (9) in both lateral directions and downward;

wherein the lens (4) is supported by a generally transparent cover (3);

wherein the cover (3) includes a peripheral portion (5) that laterally circumferentially surrounds the lens (4) and has a generally constant thickness throughout; and wherein the peripheral portion (5) and the lens (4) are both integral to the cover (3).

2. The light module (1) of claim 1, wherein the LED array (2) is elongated along a horizontal lateral axis;

wherein light emitted by the LED array (2) that transmits through the lens (4) emerges as generally collimated light; and wherein the generally collimated light has a far-field lens distribution that is generally centered along the longitudinal axis (9) and is elongated along the horizontal lateral axis.

3. The light module (1) of claim 2, wherein light emitted by the LED array (2) that reflects off the reflecting surface (6) emerges as nominally collimated light; and wherein the nominally collimated light includes a generally collimated portion proximate the far-field distribution and includes a slightly decollimated portion to the lateral sides and beneath the far-field distribution.

4. The light module (1) of claim 1, wherein the lens (4) has a front focal plane at the LED array (2) and a front focal point at the center of the LED array (2).

5. The light module (1) of claim 1, wherein the lens (4) is plano-convex;

wherein a planar face of the lens (4) faces the LED array (2); and wherein a convex face of the lens (4) faces away from the LED array (2) and includes an aspheric component.

6. The light module (1) of claim 5, wherein the aspheric component of the convex face of the lens (4) is asymmetric along horizontal and vertical cross-sections;

wherein the aspheric component along the vertical cross-section helps correct for spherical aberration; and wherein the aspheric component along the horizontal cross-section helps blur a far-field distribution of light through the lens, so that dark locations between adjacent emitters in the LED array (2) do not produce dark locations in the far-field distribution of light.

7. The light module (1) of claim 1, wherein a longitudinal distance between an outer lateral edge of the peripheral portion (5) and the LED array (2) is greater than a longitudinal distance between an inner lateral edge of the peripheral portion (5) and the LED array (2).

8. The light module (1) of claim 1, wherein the lens (4) has a generally circular outer lateral edge; and wherein the peripheral portion (5) has a generally circular inner lateral edge.

9. The light module (1) of claim 1, wherein the peripheral portion (5) has a generally circular outer lateral edge.

10. The light module (1) of claim 1, wherein the lens (4) has a generally rectangular outer lateral edge; and wherein the peripheral portion (5) has a generally rectangular inner lateral edge.

11. The light module (1) of claim 1, wherein the peripheral portion (5) has a generally rectangular outer lateral edge.

12. The light module (1) of claim 1, wherein when compared with reflections of light from the LED array (2) off a virtual surface shaped as the base curvature paraboloid, reflections of light from the LED array (2) off the facets include light that is directed farther away from the longitudinal axis (9) in both lateral directions and downward.

13. The light module (1) of claim 1, wherein when compared with the base curvature (8), the facets include additional tilts and curvatures, some of which are asymmetric in the horizontal and vertical directions.

* * * * *